United States Patent
Kozikowski et al.

(10) Patent No.: US 6,431,632 B1
(45) Date of Patent: Aug. 13, 2002

(54) AUTOMOBILE SEAT ASSEMBLY ATTACHMENT STRUCTURE

(75) Inventors: Alanna J Kozikowski, Clinton Township; Tina M Moceri-Kaleugher, Ray Township; Mark Lyjak, Washington, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/872,913

(22) Filed: Jun. 4, 2001

(51) Int. Cl.[7] .................................................. B60N 2/04
(52) U.S. Cl. .................. 296/65.03; 297/336; 248/503.1
(58) Field of Search ...................... 296/65.01, 65.03, 296/65.05; 248/503.1; 297/336, 335

(56) References Cited

U.S. PATENT DOCUMENTS

| | | | | |
|---|---|---|---|---|
| 542,536 A | * | 7/1895 | Pfleegor | 248/503.1 |
| 4,700,989 A | | 10/1987 | Ercilla | 297/331 |
| 4,759,580 A | * | 7/1988 | Berklich et al. | 296/65.03 |
| 4,773,693 A | * | 9/1988 | Premji et al. | 296/65.03 |
| 4,898,417 A | * | 2/1990 | Kudo | 296/39.1 |
| 5,120,017 A | * | 6/1992 | Feener, III | 248/188.8 |
| 5,330,245 A | * | 7/1994 | Boisset | 296/65.03 |
| 5,372,398 A | * | 12/1994 | Aneiros et al. | 296/65.03 |
| 5,498,051 A | | 3/1996 | Sponsler et al. | 296/65.1 |
| 5,634,686 A | | 6/1997 | Okazaki | 297/336 |
| 5,662,368 A | | 9/1997 | Ito et al. | 296/65.1 |
| 5,671,965 A | | 9/1997 | O'Connor | 296/65.1 |
| 5,921,606 A | * | 7/1999 | Moradell et al. | 296/65.03 |
| 5,997,069 A | * | 12/1999 | Coffey et al. | 296/65.01 |

* cited by examiner

Primary Examiner—Dennis H. Pedder
(74) Attorney, Agent, or Firm—Laura C. Hargitt (57) ABSTRACT

An improved automotive vehicle seating assembly. A seat including a back and a base having a pair of first attachment legs and a pair of second attachment legs is employed. A floor pan has slots for receiving the first attachment legs. Strikers are provided in the floor pan for latchingly receiving the second attachment legs. The first attachment legs include a projection for insertion through the cross member slots and deforming engagement with an underside of the floor pan.

20 Claims, 7 Drawing Sheets

AUTOMOBILE SEAT ASSEMBLY ATTACHMENT STRUCTURE

TECHNICAL FIELD

This invention relates to a structure for attaching a seat to an automotive vehicle body.

BACKGROUND OF THE INVENTION

It is known to employ attachment structures for securing a seat assembly to an automotive vehicle body. For example, it is known to employ a seat assembly having mounting brackets and which includes the combination of a front leg that slidably engages the automotive vehicle body and a rear leg that is bolted to the automotive vehicle body. It is also known to use assemblies having front and rear legs that are bolted to the vehicle, or to use front and rear legs that each are latched to the vehicle.

It is desirable to provide an alternative, user-friendly seating assembly structure that enables retention of a seat in a vehicle while reducing assembly steps and hardware.

SUMMARY OF THE INVENTION

The present invention meets these desires by providing an improved automotive vehicle seating assembly for an automotive vehicle body including a floor pan. A seat is provided including a seat back and an attached seat base having a pair of first attachment legs and a pair of second attachment legs, along with a floor pan having a plurality of slots for receiving the pair of first attachment legs.

A plurality of strikers are provided in the floor pan for receiving the pair of second attachment legs. The first attachment legs include a projection having an engagement surface for insertion through the slots and engagement with an underside of the floor pan. The second attachment legs include a clawhook tumbler latch for releasably latching to the strikers.

At least one of the projections is configured so that upon insertion through the slots and engagement with the underside and upon latching the second attachment legs to the strikers, the floor pan is deformed by the projection for reinforcing the engagement.

DESCRIPTION OF THE PREFERRED EMBODIMENT

Figure 1:
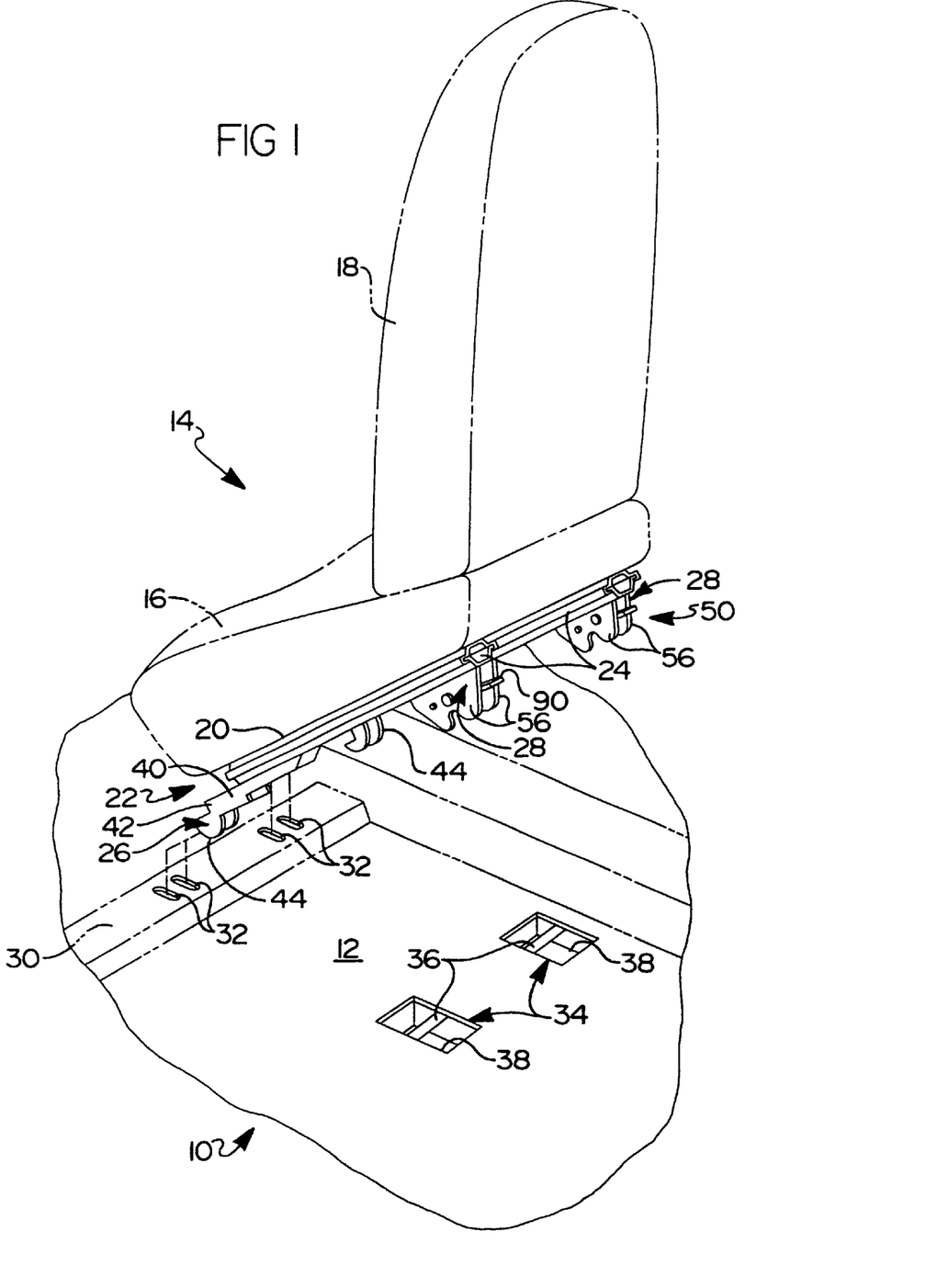
FIG. 1 is a perspective view of a seat assembly including an assembly structure in accordance with this invention.

FIG. 1 shows a bottom portion of an automotive vehicle body 10 that includes a floor pan 12 adapted for receiving and supporting a seat assembly 14. The seat assembly includes a seat 16, having a seat back portion 18 and a seat base portion 20, and a seat track assembly 22 in accordance with the present invention. The seat track assembly 22 includes a pair of opposing longitudinally oriented rails 24, each having a first attachment leg 26 and a second attachment leg 28 at the respective ends of the rails 24.

The floor pan 12 includes a first portion, including an elevated cross member 30, which is adapted for receiving and supporting the first attachment legs 26. The cross member 30 thus extends laterally across the floor pan 12, and has defined therein two pairs of slots 32 oriented along the longitudinal axis of the floor pan 12. The floor pan 12 also includes a second portion 34 adapted for receiving and supporting the second attachment legs 28. The second portion 34 of the floor pan includes a pair of strikers 36 that include laterally disposed bars secured to the floor pan 12 and recessed relative to an upper surface 38 of the floor pan 12.

Figure 2:
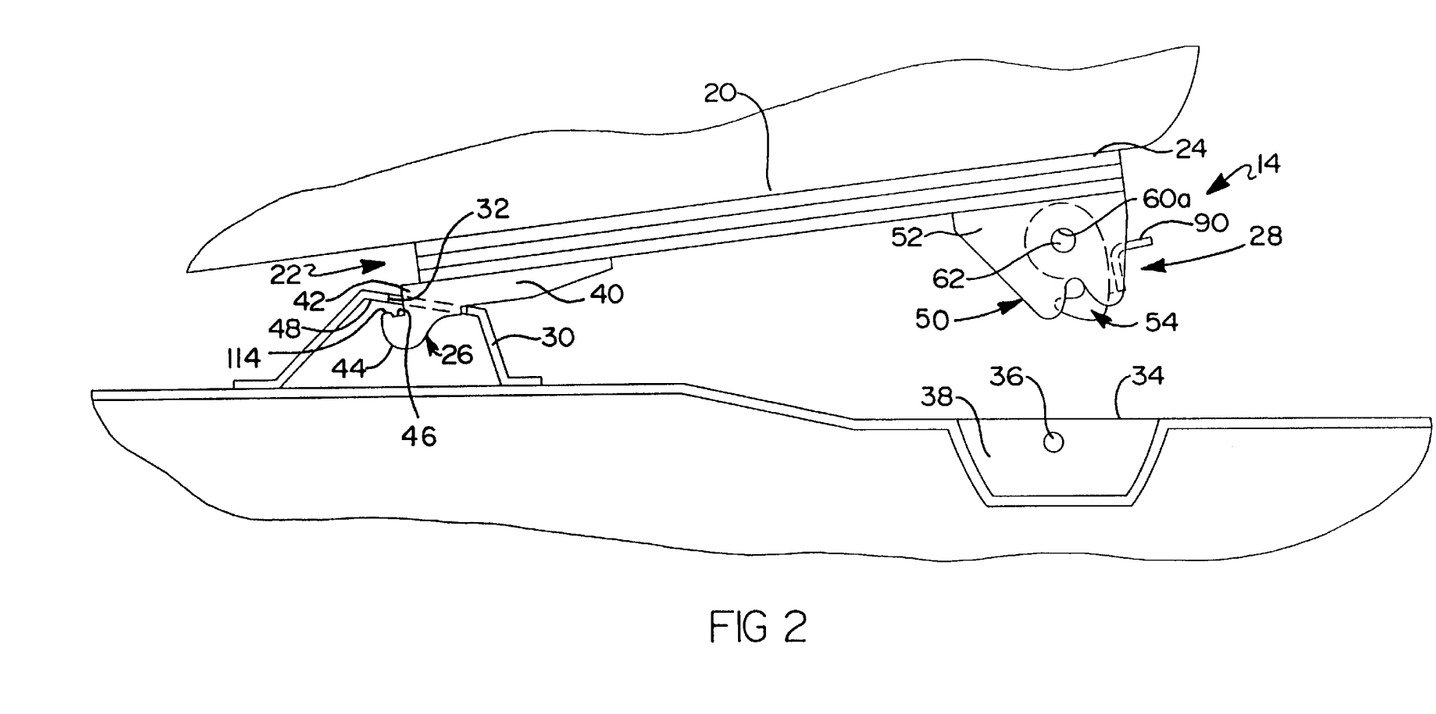
FIG. 2 is a side elevation view of the structure shown in FIG. 1 in a first position.
Figure 3:
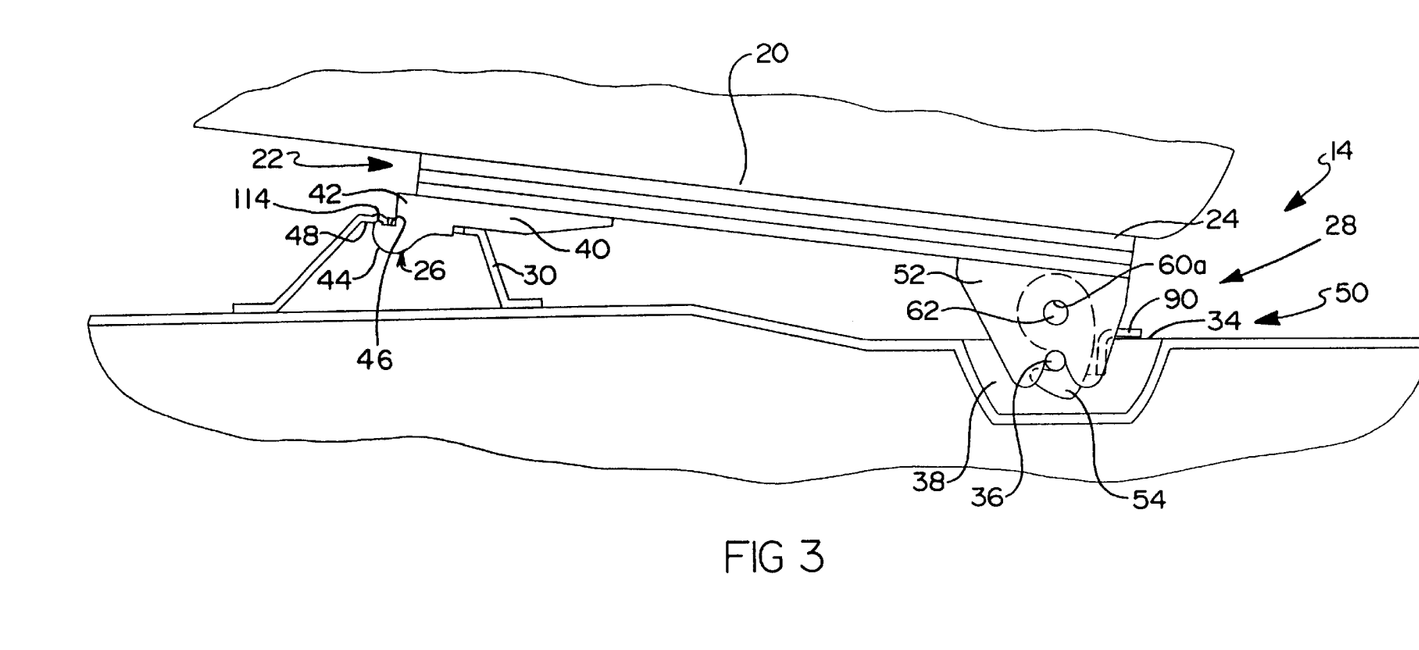
FIG. 3 is another side elevation view showing the bracket assembly shown in FIG. 1 in a second position.

Referring to FIGS. 1 3, each of the first attachment legs 26 has a wall portion 40, which adjoins and connects with a respective rail 24, and a free end 42 with a projection 44. The projection 44, in turn, includes an upper engaging surface 46 for contacting an underside 48 of the cross member 30 when placed in the slots 32. The thickness of the projection accordingly is dimensioned for insertion within the slot. The projection 44 is configured so that, upon insertion into the slots 32 and rotation into position, the upper engaging surface 46 contacts and deforms at least a portion of the underside 48 of the cross member 30 achieving a tight engagement of the first attachment legs 26 to the cross member.

Figure 4:
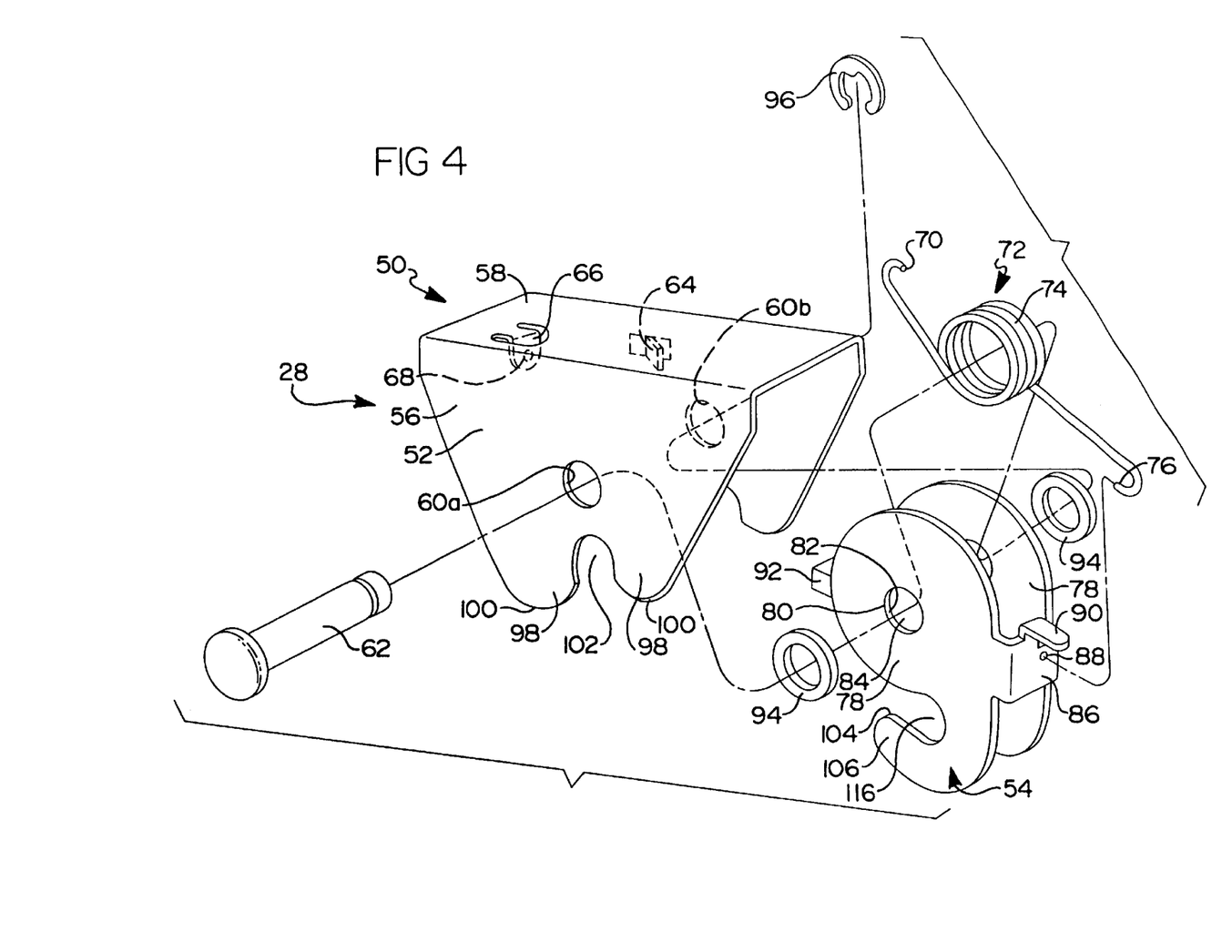
FIG. 4 is an exploded view of a clawhook tumbler assembly forming a portion of the bracket assembly shown in FIG. 1.
Figure 5:
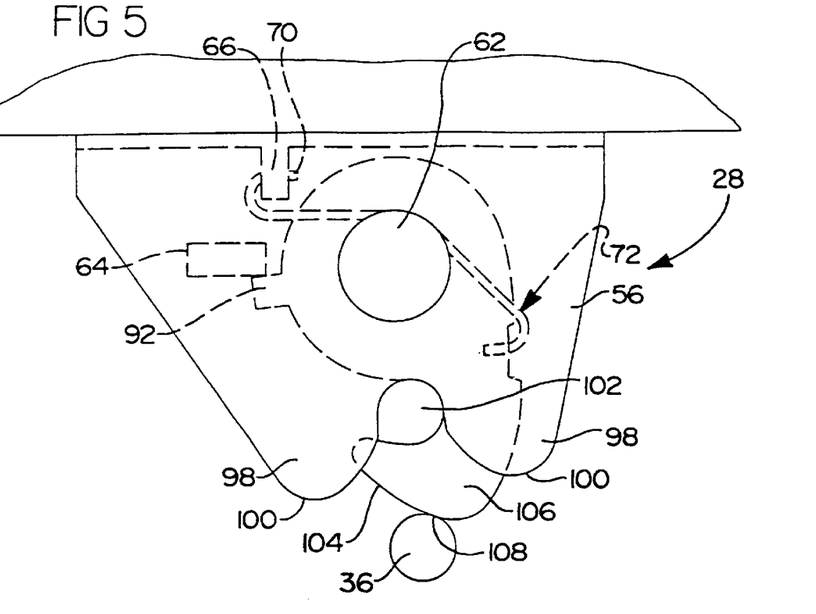
FIG. 5 is a side elevation view of the clawhook tumbler assembly in a substantially closed position, prior to engagement.
Figure 6:
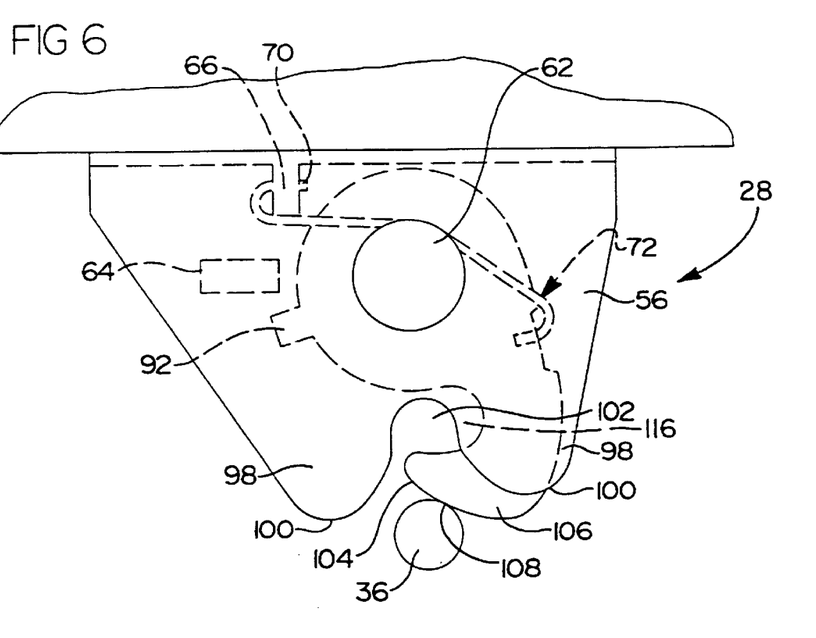
FIG. 6 is side elevation view of the clawhook tumbler assembly in a first partially opened state upon contacting a striker.
Figure 7:
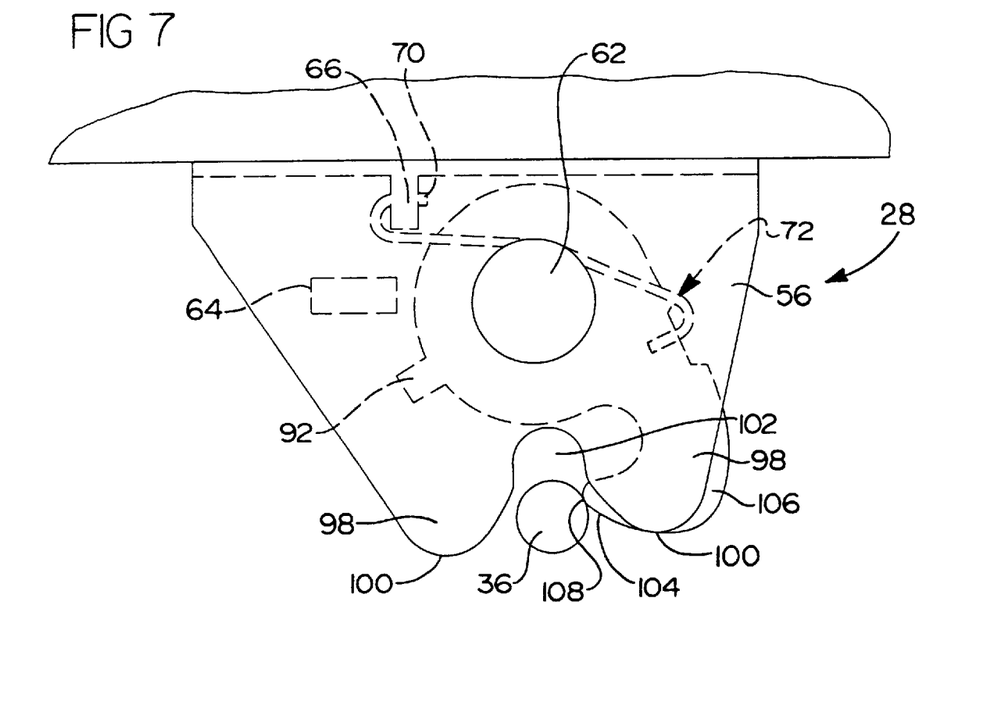
FIG. 7 is a side elevation view of the clawhook tumbler assembly in a second partially opened state.
Figure 8:
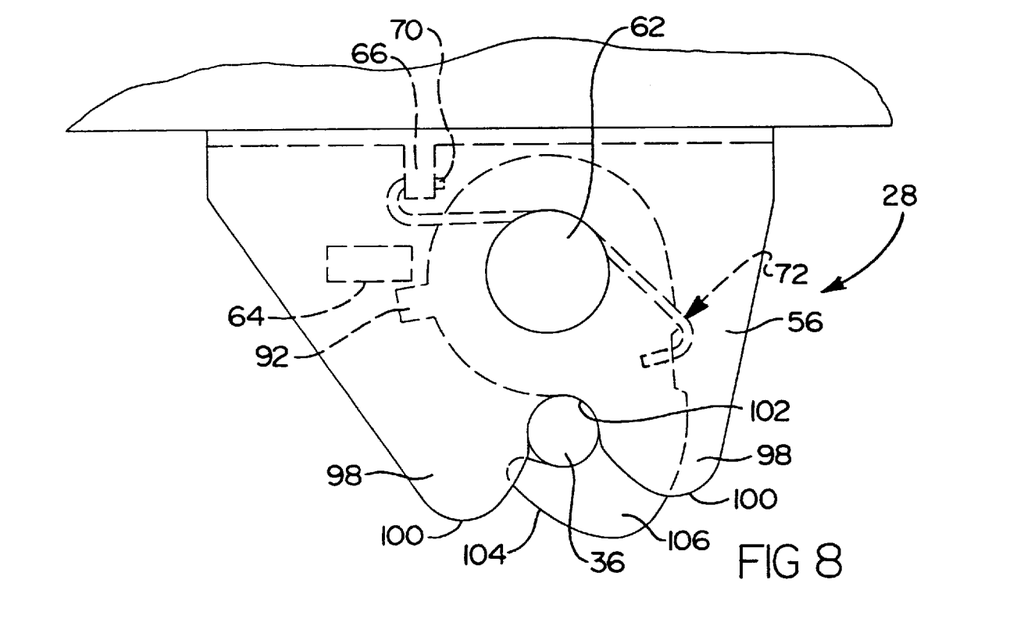
FIG. 8 is a side elevation view of the clawhook tumbler assembly engaging the striker.

As best seen in FIGS. 2 and 4, the second attachment legs 28 each include a clawhook tumbler assembly 50 including a frame 52 for attaching to the rail 24 and for pivotally carrying a latch pawl member 54. The frame 52 has a pair of opposing walls 56 depending from an intermediate web 58. The walls 56 each have a first aperture 60a and 60b in registered alignment with the other for receiving a pivot member 62 and includes at least one detent projection 64 for limiting rotational movement of the latch pawl member 54. The intermediate web 58 includes a spring mounting tab 66 having an aperture 68 for receiving a first end 70 of a tension spring 72. The spring 72 also has an intermediate coil portion 74 and a second end 76.

The latch pawl member 54 includes a pair of spaced opposing walls 78, each configured to define a pivot portion 80 including a pivot surface 82 and a second aperture 84. An interconnecting web 86 joins the walls 78 and includes an aperture 88 for receiving the second end 76 of the spring 72. A gripping surface 90 is provided on the latch pawl member 54 for facilitating actuation of the member by an operator. Moreover, a second detent projection 92 may be provided from at least one wall 78 for detent engagement with the first detent projection 64. As seen in FIG. 4, the walls 78 of the latch pawl member 54 include apertures 84 in opposing registered alignment with each other.

The clawhook tumbler assembly 50 is assembled by inserting the latch pawl member 54 into the frame 52, so that the first apertures 60a and second apertures 84 are aligned. A pair of spacers 94 is placed between the latch pawl member 54 and the frame 52. The spring 72 is connected at its respective ends 70, 76. The pivot member 62 is inserted through the spacers 94, intermediate coil portion 74 of the spring 72, and the apertures 60a, 60b and 84. The pivot member 62 is secured with a retainer clip 96.

As is seen in FIGS. 4–8 the walls 56 of the frame 52 each have a pair of fingers 98 having a continuous rounded edge 100 that join to define an inverted U-shaped receiving slot 102, which facilitates location for attachment to the vehicle. The walls 78 of the latch pawl member 54 each have a continuous rounded edge 104 generally defining a clawhook 106 opening to a radial slot 116. The clawhook 106 is spring biased and rotatable about the pivot axis defined by the pivot member 62 to open and restrict access to the receiving slot 102. The receiving slot 102 is dimensioned for a relatively close fit with the strikers 36, for limiting play upon attachment. Further, in the position shown in FIG. 5, prior to installation, the effective clearance diameter contained by the receiving slot is smaller than the diameter of the striker bar 36.

Figure 9:
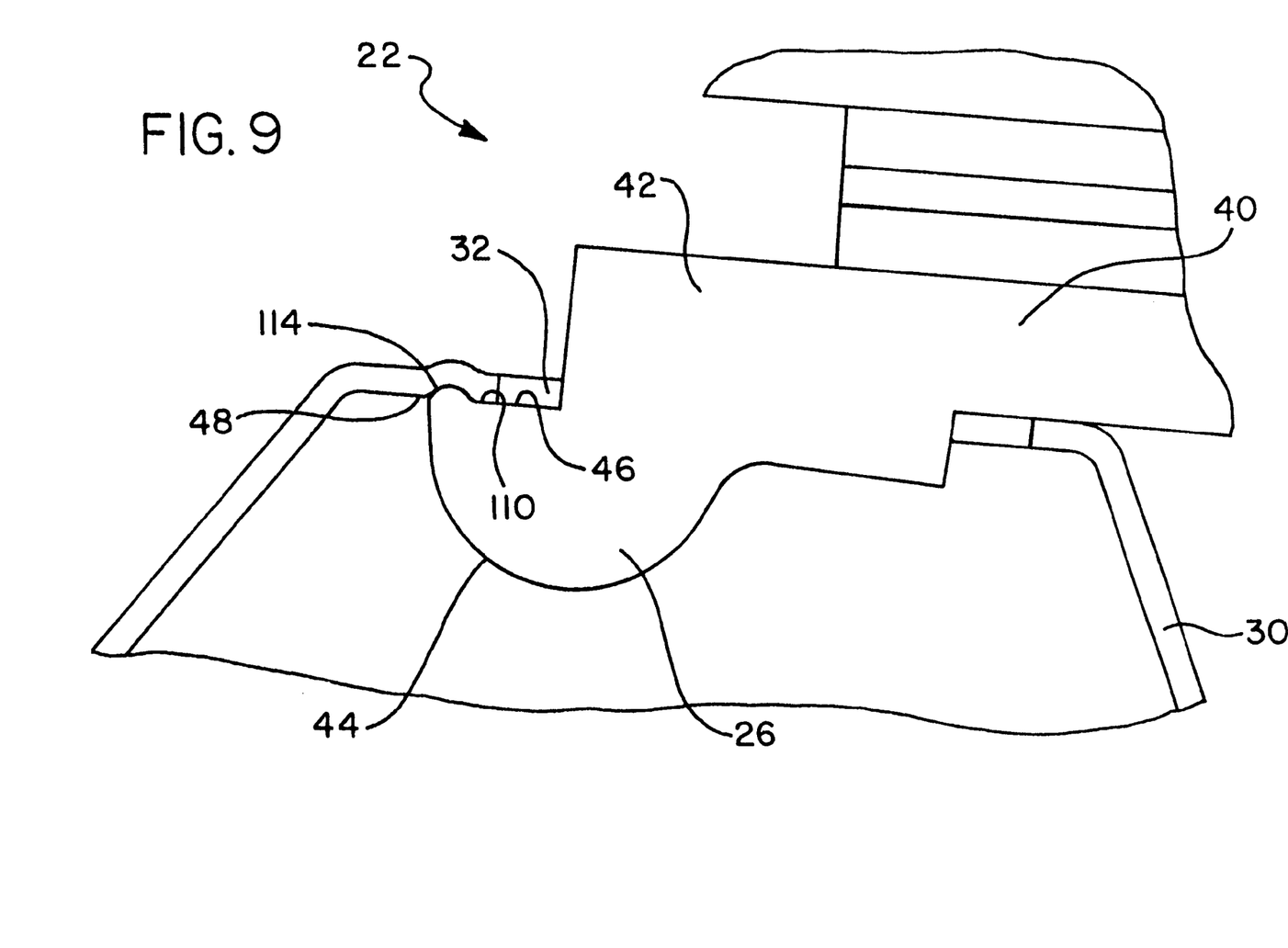
FIG. 9 is a side elevation view of a cross member to illustrate deformation of the same upon installation.

Accordingly, with reference to FIG. 9, installation of the seat 16 in the vehicle is done by tilting the seat 16 about 5° forward or otherwise as needed, (such as is shown in FIGS. 1–3), so that the projections 44 of the first attachment legs 26 are placed in their respective slots 32 to engage the underside 48 of the cross member 30. Referring again to FIG. 9, at least one of the projections 44 is configured with a hook nub 114 so that, upon insertion in the cross member slots 32 followed by lowering of the seat until latching of and engagement with the underside of the cross member 30, and upon latching the second attachment legs 28 to the strikers 36, the cross member 30 is deformed in response to the hook nub 114 for reinforcing the engagement.

As seen in FIGS. 1 and 2, the first pair of attachment legs 26 are inserted into the slots 32 and the rear of the seat 16 is progressively lowered until the rear attachment legs 28 hook onto the strikers 36. As the seat is lowered, the projections 44 rotate so that the upper engaging surface 46 and hook nub 114 is carried into contact with the underside 48 of the cross member 30. The various elements of the vehicle body 10 and the seat assembly 14 are dimensioned so that upon reaching the final latch position, the hook nub 114 will have deformed the cross member 30 to the indicated position in FIG. 9. The deformation at the front and a resulting interface 110 between an aft upper surface of the cross member 30 and the hook nub 114 of the front attachment legs 26 cooperate to provide an interference fit between the seat 16 and the vehicle body 10. The interference locking of the tumbler assemblies of the second pair of attachment legs co-acting with the engagement of the first attachment legs effectively results in a locking condition, which helps to avoid chuck and rattle conditions.

With reference again to FIGS. 5–8, as the seat assembly is being pivoted into its final position, if the clawhook 106 is in a closed position, an outer surface 108 of the clawhook 106 first contacts the striker 36. Downward force causes the latch pawl member 54 to rotate so that each striker 36 is afforded direct access into its respective receiving slot 102. Once each striker 36 is seated in its receiving slot 102, the latch pawl member 54 is biased by the spring 72 toward its closed position, in turn, securing the second attachment legs 28 of the seat assembly to the vehicle. After installation, as may be needed, an operator may grip the gripping surface 90 and apply an opposing force to release the second attachment legs 28 from their secured position. (FIG. 3)

It will be appreciated from the above that a number of variations and modifications may be made within the spirit of the present invention. For instance, the gripping surface 90 may be a projecting tab, or another suitable lever handle. The invention may be used for permanent installation of seating in a vehicle or the present invention may be used for improving removable seating. The first and second attachment legs 26, 28 may be switched between the fore and aft positions. Further, the cross member 30 need not be elevated, nor the strikers 36 recessed. Though the components may be steel, other high strength to weight materials may be substituted. The first and second attachment legs 26,28 may be welded to the respective rails or integrally formed. An additional structure could be associated with the rail for adjustability of the seat position after installation. Further, the projections 44 are shown as a hook nub 114 but may be any other structure having an engaging surface like surface 46. The projections 44 may deform in addition to or alternative to the cross member 30 for reinforcing the engagement. In this regard, on the underside 48 of the cross member 30, there may be scoring. Moreover, the present invention need not be limited lo assembling seats to a vehicle floor. It may also be used to secure other surface mounted structures.

As can be seen from the above, the present invention allows for rapid seat installation and removal, during and after vehicle assembly. Advantageously, installation and hardware expenses may be reduced through the unique combination described herein.

What is claimed is:

1. An automotive vehicle seating assembly, comprising:
   an automotive vehicle body including a floor pan having a plurality of slots; a seat including a seat back and an attached seat base having a pair of first attachment legs and a pair of second attachment legs;
   a plurality of strikers in said floor pan for receiving said pair of second attachment legs;
   said first attachment legs including a projection having an engagement surface for insertion through said floor pan slots and engagement with an underside of said floor pan; and
   said second attachment legs including a clawhook tumbler latch for latching to said strikers;
   wherein, at least one of said projections is configured so that upon insertion through said floor pan slots and engagement with said underside of said floor pan and upon latching said second attachment legs to said strikers, said floor pan is deformed by said projection for reinforcing said engagemnent.

2. An automotive vehicle seating assembly as defined in claim 1, wherein at least one of said projections and said floor pan deform during engagement.

3. An automotive vehicle seating assembly as defined in claim 1, wherein at least one of said projections includes a hook nub for engagement.

4. An automotive vehicle seating assembly as defined in claim 1, wherein said floor pan slots are in an elevated portion of said floor pan.

5. An automotive vehicle seating assembly as defined in claim 1, wherein said first attachment legs are disposed in said vehicle body forward of said second attachment legs.

6. An automotive vehicle seating assembly as defined in claim 1, wherein said strikers are recessed in said floor pan.

7. An automotive vehicle seating assembly, comprising:
   an automotive vehicle body including a floor pan;
   a seat including a seat back and an attached seat base having a pair of first attachment legs and a pair of second attachment legs;

an elevated sheet metal cross member on said floor pan having a plurality of slots for receiving said pair of first attachment legs;

a plurality of strikers recessed in said floor pan for receiving said pair of second attachment legs;

said first attachment legs including a projection for insertion through said cross member slots and engagement with an underside of said elevated sheet metal cross member; and said second attachment legs including a clawhook tumbler latch for latching to said strikers;

wherein, at least one of said projections is configured so that upon insertion through said sheet metal cross member slots and engagement with said underside and upon latching said second attachment legs to said strikers, said sheet metal cross member is deformed by said projections for reinforcing said engagement.

8. An automotive vehicle seating assembly as defined in claim 7, wherein at least one of said projections is configured to have a bulbous profile.

9. An automotive vehicle seating assembly as defined in claim 8, wherein at least one of said projections further includes a nub on an upper portion.

10. An automotive vehicle seating assembly as defined in claim 7, wherein said at least one of said projections forms a raised dimple in said floor pan.

11. An automotive vehicle seating assembly as defined in claim 7, wherein said underside of said cross member is scored by said projections.

12. An automotive vehicle seating assembly as defined in claim 7, wherein said clawhook tumbler latch includes a spring biased pivotal latch pawl member.

13. An automotive vehicle seating assembly as defined in claim 12, wherein said latch is configured with a lever handle for rotating said latch pawl member.

14. An automotive vehicle seating assembly, comprising:

an automotive vehicle body including a floor pan;

a seat including a seat back and an attached seat base having a pair of first attachment legs and a pair of second attachment legs;

an elevated sheet metal cross member on said floor pan having a plurality of slots for receiving said pair of first attachment legs; and a plurality of strikers recessed in said floor pan for receiving said pair of second attachment legs;

said first attachment legs each including a bulbous tab having a nub with an engagement surface for insertion through said cross member slots and engagement with an underside of said elevated sheet metal cross member;

said second attachment legs including a clawhook tumbler latch for releasably latching to said strikers; and wherein, said nubs are configured so that upon insertion through said sheet metal cross member slots and engagement with said underside and upon latching said second attachment legs to said strikers, said sheet metal cross member is deformed by said nubs for reinforcing said engagement.

15. An automotive vehicle seating assembly as defined in claim 14, wherein said nubs form a raised dimple in said floor pan.

16. An automotive vehicle seating assembly as defined in claim 14, wherein said underside of said cross member is scored by said nubs.

17. An automotive vehicle seating assembly as defined in claim 14, wherein said clawhook tumbler latch includes a spring biased pivotal latch pawl member.

18. An automotive vehicle seating assembly as defined in claim 17, wherein said latch is configured with a lever handle for rotating said latch pawl member.

19. An automotive vehicle seating assembly as defined in claim 17, wherein said strikers include laterally disposed bars.

20. An automotive vehicle seat assembly as defined in claim 19, wherein said clawhook tumbler latches have a locator slot and when said latch pawl member is closed, an opening is defined between said latch pawl member and said locator slots having an effective clearance diameter smaller than the diameter of said striker bar.

* * * * *